United States Patent
Truettner

(10) Patent No.: US 9,843,192 B2
(45) Date of Patent: Dec. 12, 2017

(54) OPEN FUSE DETECTION SYSTEM FOR A SOLAR INVERTER

(71) Applicant: ABB Inc., Cary, NC (US)

(72) Inventor: Donald J. Truettner, Waukesha, WI (US)

(73) Assignee: ABB Inc., Cary, NC (US)

( * ) Notice: Subject to any disclaimer, the term of this patent is extended or adjusted under 35 U.S.C. 154(b) by 366 days.

(21) Appl. No.: 13/629,749

(22) Filed: Sep. 28, 2012

(65) Prior Publication Data

US 2014/0091625 A1 Apr. 3, 2014

(51) Int. Cl.
*H02J 3/38* (2006.01)

(52) U.S. Cl.
CPC ............. *H02J 3/383* (2013.01); *Y02E 10/563* (2013.01); *Y10T 307/50* (2015.04)

(58) Field of Classification Search
CPC .. H02J 1/00; H02J 3/383; H02S 50/10; H02S 40/32; H02H 7/122; Y10T 307/50; Y02E 10/563
USPC ................................... 307/43; 324/509, 537
See application file for complete search history.

(56) References Cited

U.S. PATENT DOCUMENTS

| | | | | |
|---|---|---|---|---|
| 5,612,582 A | * | 3/1997 | Shichi | H03K 17/04206 307/125 |
| 6,653,549 B2 | * | 11/2003 | Matsushita | G08B 13/128 136/244 |
| 2009/0323238 A1 | * | 12/2009 | Gehrke | H05B 33/089 361/56 |
| 2011/0031813 A1 | * | 2/2011 | Falk | H02J 3/383 307/77 |
| 2012/0049627 A1 | * | 3/2012 | Matsuo | H01L 31/02021 307/43 |
| 2012/0104975 A1 | * | 5/2012 | Vigh | H05B 33/0809 315/307 |
| 2012/0242321 A1 | * | 9/2012 | Kasai | G01J 5/0066 324/72 |
| 2013/0285670 A1 | * | 10/2013 | Yoshidomi | G01R 31/025 324/510 |

* cited by examiner

*Primary Examiner* — Daniel Kessie

(74) *Attorney, Agent, or Firm* — Taft Stettinius & Hollister LLP

(57) ABSTRACT

A photovoltaic power circuit is provided and includes a plurality of strings of connected photovoltaic panels operable to generate DC current from solar radiation. Each of the strings is connected to a solar inverter by a pair of fuses. A detection circuit is provided that is operable to detect when one of the fuses opens as a result of a fault, regardless whether the fault is temporary or continuing.

18 Claims, 7 Drawing Sheets

OPEN FUSE DETECTION SYSTEM FOR A SOLAR INVERTER

BACKGROUND OF THE INVENTION

This invention relates to fault detectors and, more particularly to a faulted fuse detector for an inverter connected to strings of photovoltaic panels.

A conventional photovoltaic power circuit typically includes a plurality of photovoltaic (PV) strings connected to an inverter. Each PV string is comprised of a plurality of PV panels that be connected together in series and/or parallel. The PV panels are operable to generate DC current from solar radiation. Each PV string has both a positive lead and a negative lead. An inverter typically can accept between 1 and 4 string inputs, depending on the power levels involved. Each PV string is usually protected from an over-current condition, typically with so-called string fuses. These string fuses are designed to safely open under a fault condition. Typically, under such a fault condition, an element within the fuse will melt and open up, thus interrupting the flow of fault current. For more robust protection levels, both the positive and negative string leads are fused.

The inverter can only output maximum power when all PV strings are producing power to the input of the inverter. If one string has a fault and the fuse opens, the output power level of the inverter will be significantly reduced. Often, the fault goes undetected, and the inverter continues to run, albeit at a much lower output power level, which is uneconomical.

Based on the foregoing, there is a need in the art for a detector that is operable to detect faulted fuses in PV strings connected to an inverter. The present invention is directed to such a detector.

SUMMARY OF THE INVENTION

In accordance with the present invention, a photovoltaic power circuit is provided and includes a string of connected photovoltaic panels operable to generate DC current from solar radiation. Positive bypass lines connect a positive lead of the string to first and second nodes on a positive DC bus, respectively. Negative bypass lines connect a negative lead of the string to first and second nodes on the negative DC bus, respectively. A solar inverter is connected to the positive and negative DC buses to receive the DC current from the string and to convert the DC current to AC current. A first fuse is connected between the positive lead of the string and the positive DC bus. A second fuse is connected between the negative lead of the string and the negative DC bus. A first sense circuit is connected to the positive DC bus and is operable to generate a first signal when a potential difference between the first and second nodes of the positive DC bus exceeds a predetermined voltage. The first signal provides an indication that the first fuse has opened. A second sense circuit is connected to the negative DC bus and is operable to generate a second signal when a potential difference between the first and second nodes of the negative DC bus exceeds the predetermined voltage. The second signal provides an indication that the second fuse has opened.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
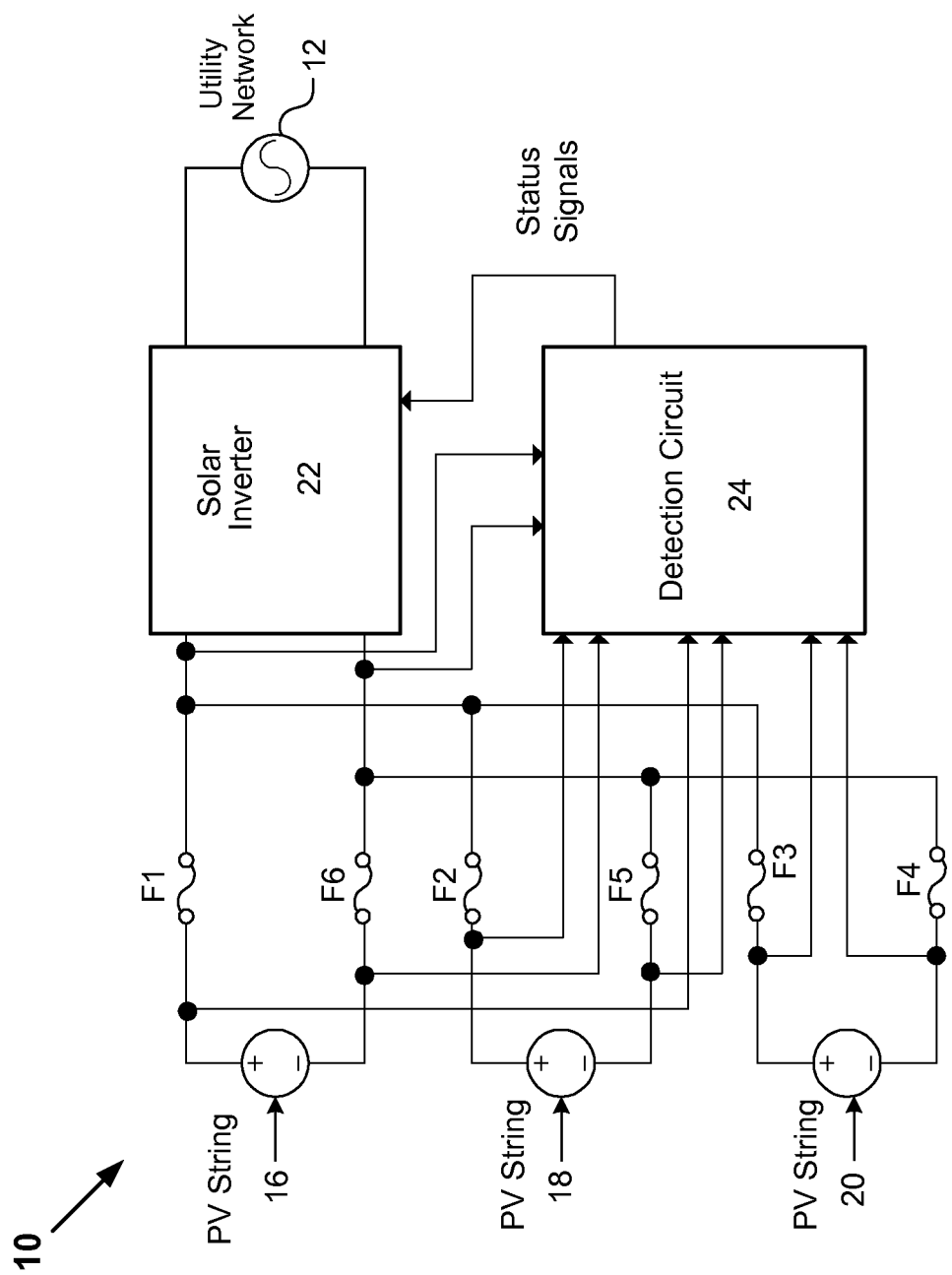
FIG. 1 shows a schematic drawing of a photovoltaic power circuit with a detection circuit embodied in accordance with the present invention.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Referring now to FIG. 1, there is shown a PV power circuit 10 for supplying AC power to a utility network 12. The PV power circuit 10 generally comprises a plurality of PV strings 16, 18, 20, a solar inverter 22 and a detection circuit 24.

Each of the PV strings 16-20 comprises a plurality of PV panels connected together in series and/or parallel. For example, groups of PV panels may be connected in parallel, with each group comprising a plurality of series-connected PV panels. In this manner, each of the PV strings 16-20 can be configured to provide a desired current and voltage. The desired currents and voltages can differ amongst the PV strings 16-20.

Figure 2:
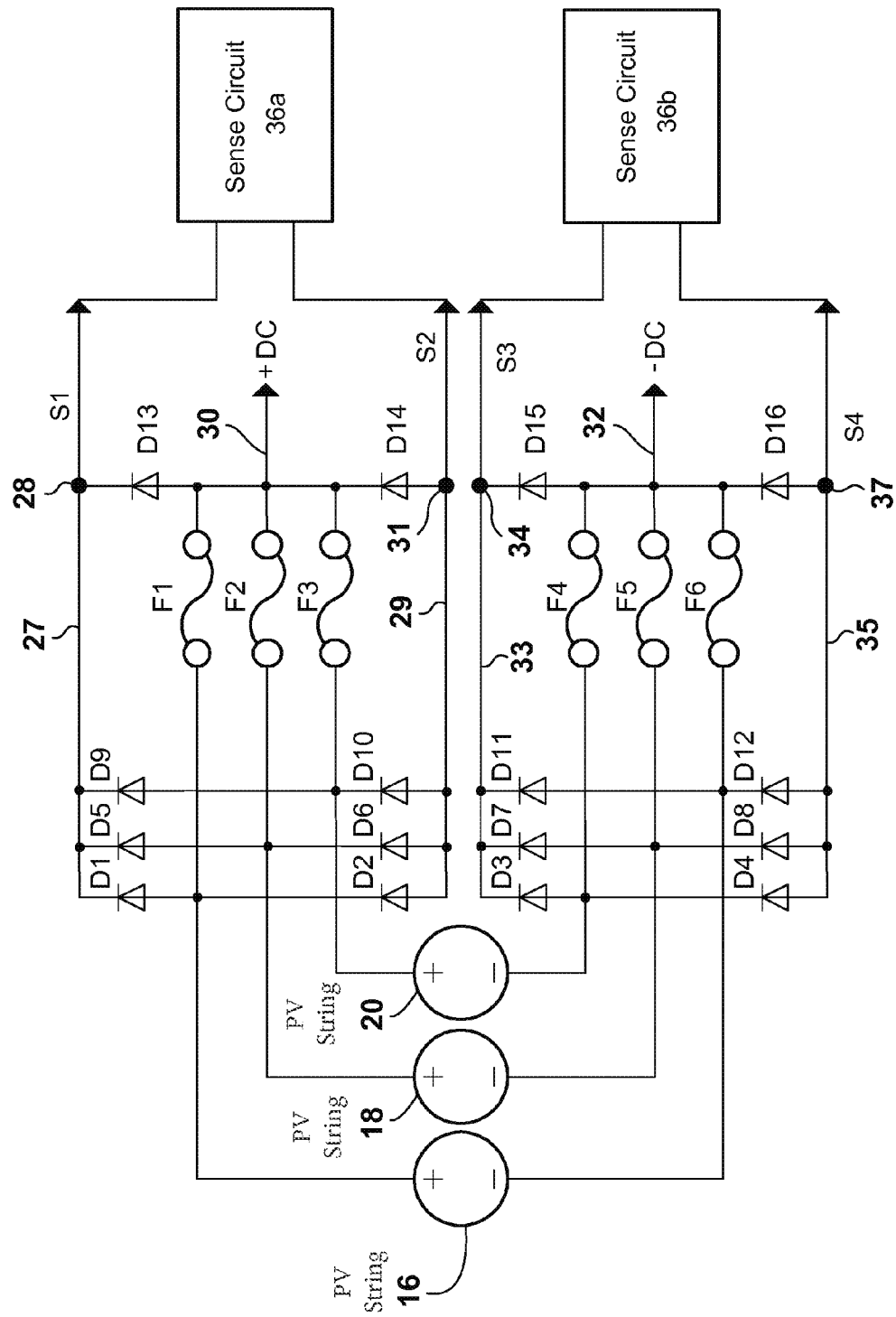
FIG. 2 shows a circuit schematic of a plurality of photovoltaic strings connected to positive and negative DC buses.

Referring now to FIG. 2, the connection between the PV strings 16-20 and buses providing current to the inverter 22 is shown. The positive lead of PV string 16 is connected to a first side of fuse F1, the positive lead of PV string 18 is connected to a first side of fuse F2 and the positive lead of PV string 20 is connected to a first side of fuse F3. Second sides of fuses F1, F2 and F3 are connected together to form a combined positive DC bus 30. In a manner similar to the positive leads, the negative leads of PV strings 16, 18, 20 are connected to first sides of fuses F6, F5 and F4 respectively, and second sides of fuses F6, F5 and F4 are connected together to form a combined negative DC bus 32. The positive and negative DC buses 30, 32 are connected to the solar inverter 22, which converts DC current from the buses to AC current. The AC current is then provided to the utility network 12. The voltage of the power from the solar inverter 22 may be stepped up through a transformer before it is provided to the utility network 12.

The positive lead of PV string 16 is connected to the anode of diode D1 and the cathode of diode D2. The positive lead of PV string 18 is connected to the anode of diode D5 and the cathode of diode D6. The positive lead of PV string 20 is connected to the anode of diode D9 and the cathode of diode D10. The positive DC bus 30 is connected to the anode of diode D13 and the cathode of diode D14. The cathodes of diodes D1, D5 and D9 are connected to a bypass line 27, which is connected at a first node 28 to a signal line S1. The cathode of the diode D13 is also connected to the signal line S1 at the first node 28. The anodes of diodes D2, D6 and D10 are connected to a bypass line 29, which is connected at a second node 31 to a signal line S2. The anode of the diode D14 is also connected to the signal line S2 at the second node 31.

The negative lead of PV string 16 is connected to the anode of diode D11 and the cathode of diode D12. The negative lead of PV string 18 is connected to the anode of diode D7 and the cathode of diode D8. The negative lead of PV string 20 is connected to the anode of diode D3 and the cathode of diode D4. The negative DC bus 32 is connected to the anode of diode D15 and the cathode of diode D16. The cathodes of diodes D3, D7 and D11 are connected to a bypass line 33, which is connected at a first node 34 to a signal line S3. The cathode of the diode D15 is also connected to the signal line S3 at the first node 34. The anodes of diodes D4, D8 and D12 are connected to a bypass line 35, which is connected at a second node 37 to a signal line S4. The anode of the diode D16 is also connected to the signal line S4 at the second node 37.

Under normal circumstances, each of the fuses F1, F2 and F3 will appear as a short circuit and have the same voltage on the input and the output, resulting in no potential difference across the fuse. With no potential differences across the fuses F1, F2, F3 there can be no potential difference between the signal lines S1 and S2. Similarly, under normal circumstances, each of the fuses F4, F5 and F6 will appear as a short circuit and have the same voltage on the input and the output, resulting in no potential difference across the fuse. With no potential differences across the fuses F4, F5, F6, there can be no potential difference between the signal lines S3 and S4.

The detection circuit 24 includes the diodes D1 through D16 and a pair of sense circuits 36, each having the same construction. To distinguish between the two sense circuits 36, one is referred to as sense circuit 36a and the other one is referred to as sense circuit 36b. The sense circuit 36a is connected to the signal lines S1 and S2, while the sense circuit 36b is connected to the signal lines S3 and S4.

Figure 3:
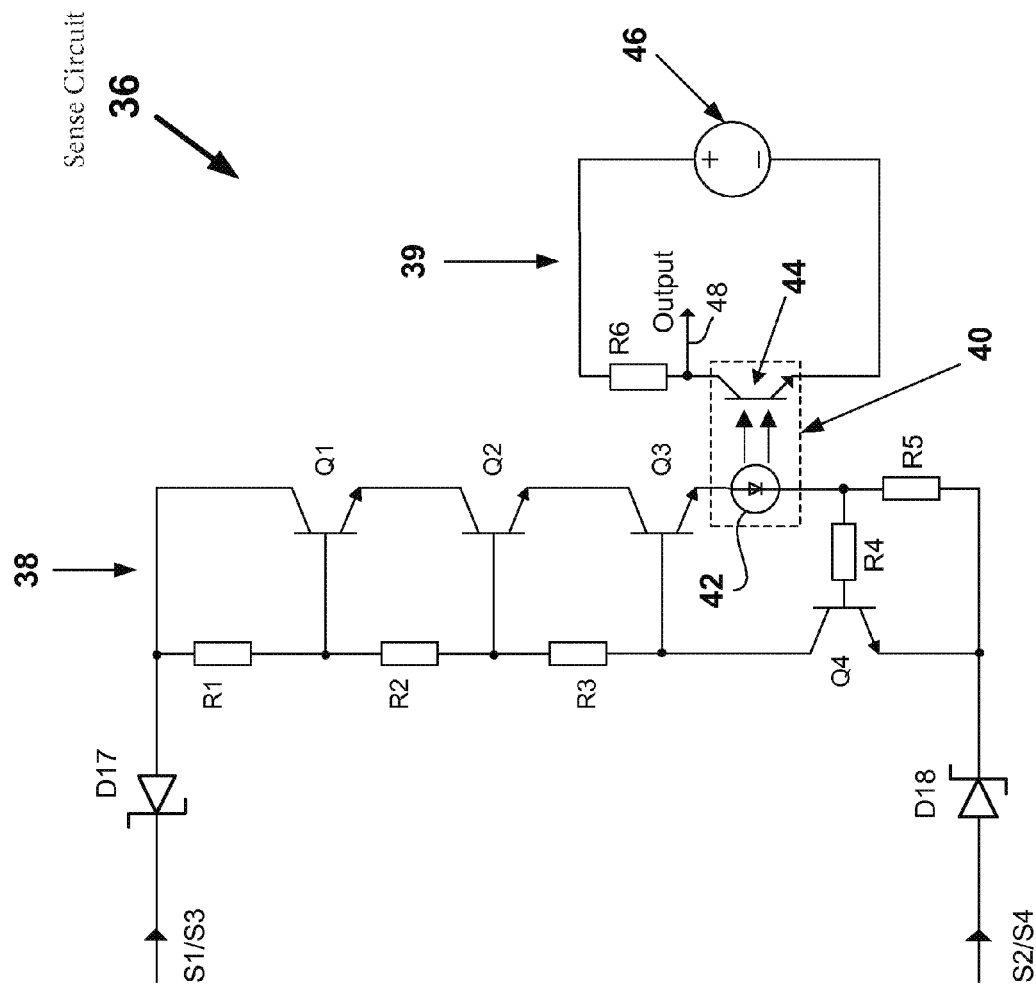
FIG. 3 shows a circuit schematic of a sense circuit of the detection circuit.

Referring now to FIG. 3, the construction of the sense circuit 36 is shown. The sense circuit 36 generally includes a main circuit 38 and a signal generating circuit 39. The main circuit 38 includes Zener diodes D17, D18, resistors R1, R2, R3, R4 and R5; NPN transistors Q1, Q2, Q3 and Q4 and an LED 42 of an opto coupler 40. The signal generating circuit 39 includes a phototransistor 44 of the opto coupler 40, a power source 46 and a resistor R6.

Each of the Zener diodes D17, D18 only conducts a reasonable amount of current when the voltage applied across it exceeds the breakdown voltage rating of the diode. Resistors R1-R3 supply base current to transistors Q1-03 respectively. Transistors Q1-03 are biased in such a way as to operate in the linear region of their V-I curve and will share the voltage applied across the signal lines S1 and S2 (or S3 and S4) approximately equal. The opto coupler 40 includes the LED 42 and the phototransistor 44. The anode of the LED 42 is connected to the emitter of the transistor Q3 and the cathode of the LED 42 is connected to the junction of resistors R4 and R5. The phototransistor 44 is optically isolated from the LED 42 and can safely be at a different voltage reference. The power source 46 can produce any level of voltage that is within the limits of operation of the opto coupler 40. The collector of the phototransistor 44 is connected to the power source 46 with the resistor R6. When the LED 42 is active (i.e. generates light), collector current in the phototransistor 44 flows and the collector of the phototransistor 44 gets pulled low to approximately the same potential as the emitter of the phototransistor 44. In this manner, the signal generating circuit 39 is operable to generate an output 48 that transitions from a high state to a low state when light from the LED 42 is detected by the base of the phototransistor 44. The output 48 is connected to a node between the resistor R6 and the collector of the phototransistor 44.

As will be described in more detail below, the output 48 of the sense circuit 36a provides an indication when one or more of the fuses F1-F3 opens due to a fault, regardless whether the fault clears or not. Similarly, the output 48 of the sense circuit 36b provides an indication when one or more of the fuses F4-F6 opens due to a fault, regardless whether the fault clears or not. The outputs 48 of the sense circuits 36a,b may be connected to one or more indicator lamps on the inverter 22 and/or to a monitoring and control system that is operable to monitor and/or control the PV power circuit 10. In one embodiment, the outputs 48 of the sense circuits 36a,b are connected to a pair of indicator lamps, respectively. In this embodiment, the lamp associated with sense circuit 36a will be lit when all of the fuses F1-F3 are closed and will be unlit if one or more of the fuses F1-F3 is open. Similarly, the lamp associated with sense circuit 36b will be lit when all of the fuses F4-F6 are closed and will be unlit if one or more of the fuses F4-F6 opens. The outputs 48 may also be combined to provide a single signal that indicates whether any one of the fuses F1-F6 is open.

In the sense circuit 36, transistor Q4, resistor R4 and resistor R5 form a current-regulating sub-circuit or system. The current in resistor R5 is approximately equal to the current of the LED 42. When the voltage drop across the resistor R5 reaches approximately the forward voltage drop of the base-emitter junction of the transistor Q4, the transistor Q4 turns on and starts conducting collector current. This collector current comes from the bias resistor R3 and lowers base current from the transistor Q3, thereby reducing its emitter current. In this manner, transistor Q4 and resistors R4 and R5 function as a negative feedback system that regulates the current in the LED 42. The level of current can be programmed by selecting an appropriate value for R5.

The general operation of the sense circuit 36a will now be described; it being understood that the operation of the sense circuit 36b is substantially the same. When the voltage applied across the signal lines S1 and S2 slightly exceeds the breakdown voltage for D17 and D18, current flows into the main circuit 38 through signal line S1, travels through the opto coupler 40 and out of the signal line S2. The current activates the LED 42 in the opto coupler 40, causing the LED 42 to shine light on the base of the phototransistor 44, which transitions the output 48 to the low state and provides an indication that one of the fuses F1-F3 has opened. The current in the LED 42 is regulated by transistor Q4 and resistors R4 and R5, as described above. As the voltage across the signal lines S1 and S2 increases, the voltage drop between the anode of the LED 42 and the emitter of Q4 remains essentially constant. Transistors Q1-Q3 share the remaining voltage drop across their collector-emitter junctions respectively. This dynamic voltage sharing allows the sense circuit 36a to operate at a reasonably wide voltage range while still maintaining current regulation.

Two types of faults can occur in this system. One type of fault is where a short circuit occurs across a PV string 16, 18 or 20 and the fault remains, i.e., is a continuing fault. The other type of fault is where a short circuit occurs across the PV string 16, 18 or 20, but then the fault conditions clears, i.e., is a temporary fault. The sense circuits 36a,b are operable to detect an open one of the fuses F1-F6 for either type of fault.

The operation of the sense circuits 36a,b for a continuing fault will be described first.

Figure 4:
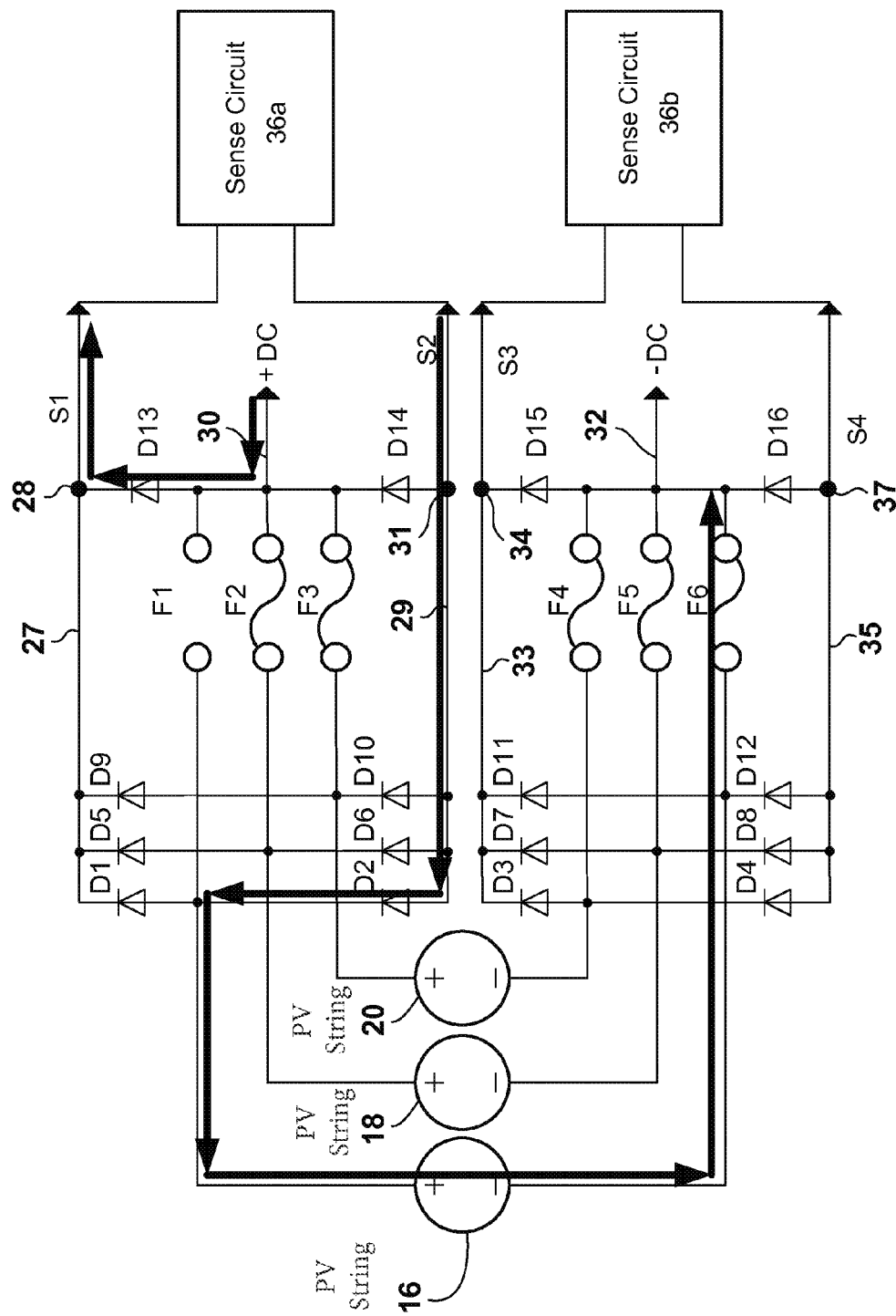
FIG. 4 shows the current flow in the circuit of FIG. 2 after the occurrence of a first fault.

Referring now to FIG. 4, it will be assumed (for purposes of discussion) that a failure has occurred and that the leads of the PV string 16 are shorted together. Currents from the PV string 18 and the PV string 20 flow into the shorted PV string 16 through both fuses F1 and F6. Typically, one of the fuses F1, F6 will open and the other one of the fuses F1, F6 will remain closed. If fuse F1 opens, it will look like an open circuit. Since the short is across the PV string 16, the positive lead of the PV string 16 is now near the same potential as the negative lead of the PV string 16. When this happens, current will flow out of the positive DC bus 30, through D13 and into the sense circuit 36a through the signal line S1. After flowing through the opto coupler 40 and thereby transitioning the output 48 to the low state, the current flows into S2, through D2 and the short in the PV string 16 and then back to the negative DC bus 32. This fault current flow is shown by the dark black arrows.

Figure 5:
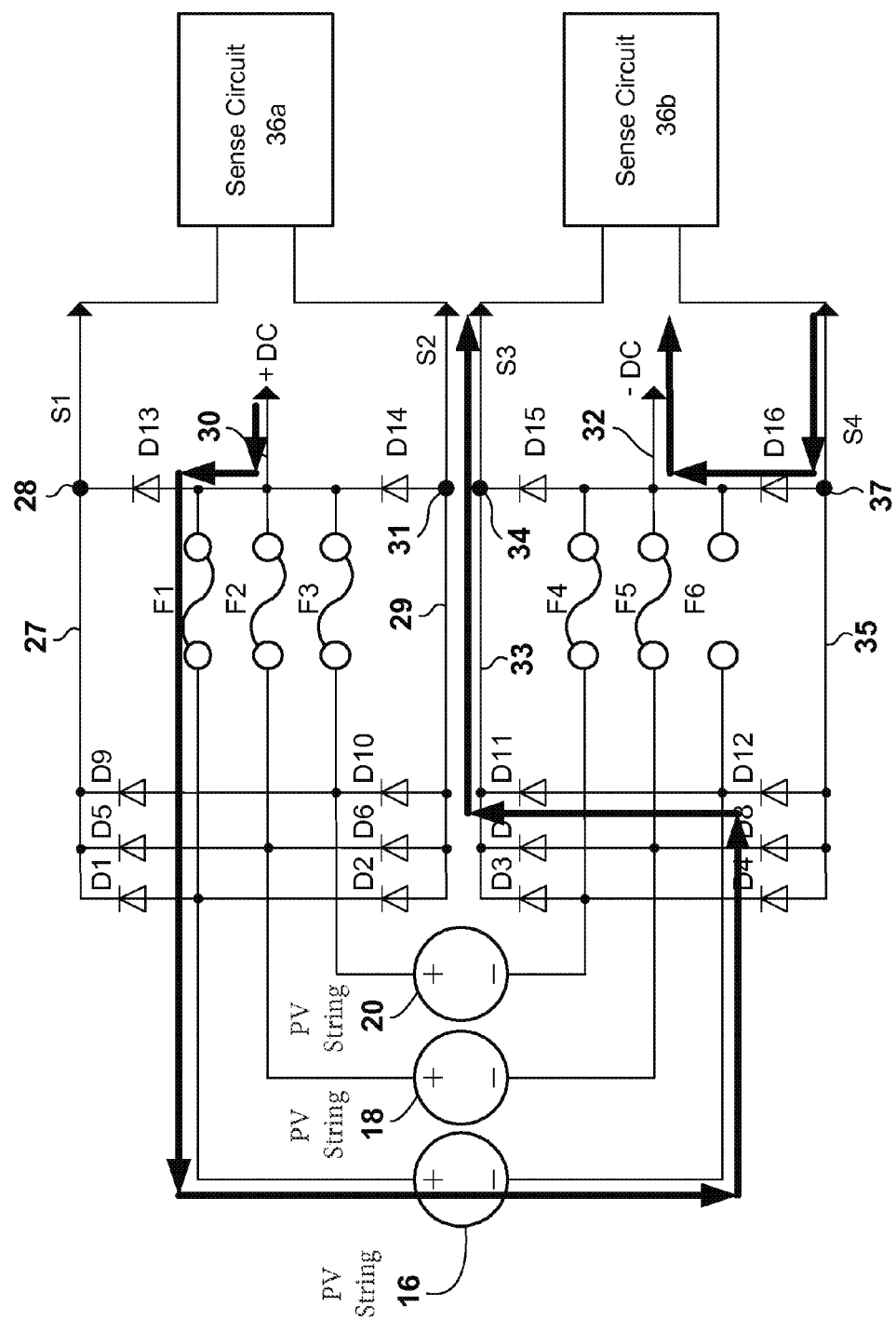
FIG. 5 shows the current flow in the circuit of FIG. 2 after the occurrence of a second fault.

Referring now to FIG. 5, if in the continuing fault scenario for PV string 16 the fuse F6 opens instead of the fuse F1, the negative lead of the PV string 16 will be near the same potential as the positive lead of the PV string 16. Current will flow from the positive DC bus 30 and through fuse F1. Current will then flow through the short circuit of the PV string 16, through D11 and into the sense circuit 36b, through the signal line S3. After flowing through the opto coupler 40 and thereby transitioning the output 48 to the low state, the current flows into the signal line S4, through D16 and then back to the negative DC bus 32. This fault current flow is shown by the dark black arrows.

The operation of the sense circuits 36 for a temporary fault will now be described.

Figure 6:
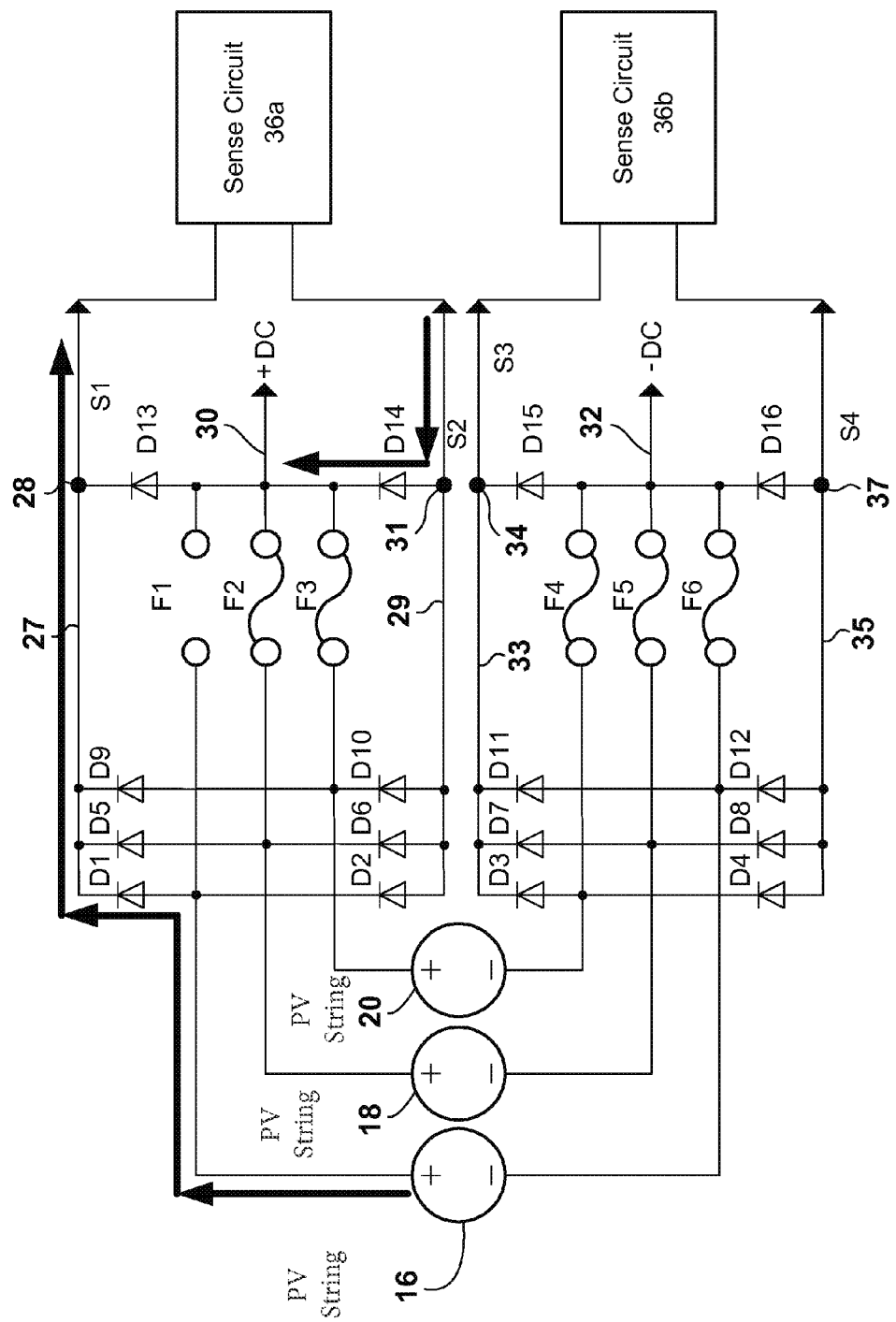
FIG. 6 shows the current flow in the circuit of FIG. 2 after the occurrence of a third fault.

Referring now to FIG. 6, it will once again be assumed (for purposes of discussion) that a fault has occurred in the PV string 16. This time, however, it will be assumed that the fault clears after an initial period of time. More specifically, it will be assumed that a short circuit has occurred in PV string 16, fuse F1 opens and then the fault condition clears. In this situation, the PV string 16 will go from a near full load condition to a no load condition. When this happens, the voltage across the PV string 16 will increase, typically between 10 to 15 percent. Now, the open circuit voltage of the PV string 16 is higher than the voltage of the positive DC bus 30 (and also the PV strings 18, 20 since their fuses are still intact). Current will flow out of the PV string 16, through D1 and into the sense circuit 36a through the signal line S1. In this regard, it should be noted that D13 is reversed biased since the open circuit voltage of the PV string 16 is greater than the voltage of the positive DC bus 30. After entering the sense circuit 36a, the current flows through the opto coupler 40, thereby transitioning the output 48 to the low state. Thereafter, the current flows into the signal line S2, through D18 and then back to the positive DC bus 30. This fault current flow is shown by the dark black arrows.

Figure 7:
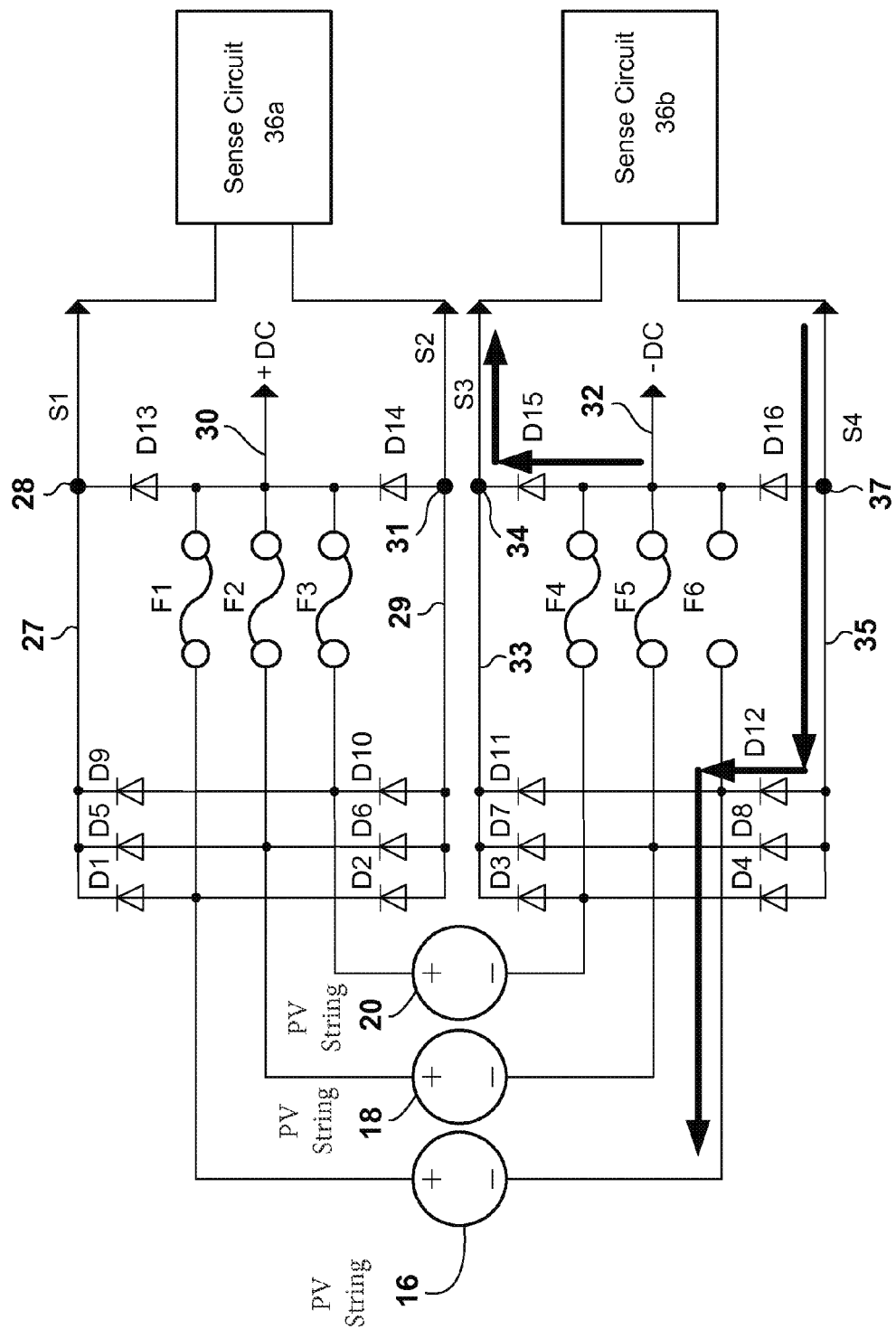
FIG. 7 shows the current flow in the circuit of FIG. 2 after the occurrence of a fourth fault.

Referring now to FIG. 7, if in the temporary fault scenario for PV string 16 the fuse F6 opens instead of the fuse F1 (and then the fault clears), the open circuit voltage of the PV string 16 is greater than the DC buses 30, 32, making the negative lead of the PV string 16 more negative than the negative DC bus 32. Current will now flow from the negative DC bus 32, through D15 and into the sense circuit 36b, through the signal line S3. After entering the sense circuit 36b, the current flows through the opto coupler 40, thereby transitioning the output 48 to the low state. Thereafter, the current flows into the signal line S4, through D12 and then back to the negative lead of the PV string 16. This fault current flow is shown by the dark black arrows.

It should be recalled that for a continuing fault in the PV string 16 with F1 opening, the current to activate the sense circuit 36 (i.e. transitioning the output 48 to the low state) comes from the positive DC bus 30. However, for a temporary fault in the PV string 16 with F1 opening, the current to activate the sense circuit 36 comes from the potential difference between the unloaded PV sting 16 and the positive DC bus 30.

In the description above, only faults in the PV string 16 are described. It should be appreciated, however, that faults in the PV strings 18, 20 are handled in a similar manner. More specifically, the above description for PV string 16 applies mutatis mutandis to PV string 18, with PV string 18 replacing PV string 16 and vice versa, fuse F2 replacing fuse F1, fuse F5 replacing fuse F6, diode D5 replacing diode D1, diode D6 replacing diode D2, diode D7 replacing diode D11 and diode D8 replacing diode D12. The above description above for PV string 16 applies mutatis mutandis to PV string 20, with PV string 20 replacing PV string 16 and vice versa, fuse F3 replacing fuse F1, fuse F4 replacing fuse F6, diode D9 replacing diode D1, diode D10 replacing diode D2, diode D3 replacing diode D11 and diode D4 replacing diode D12.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A photovoltaic power circuit comprising:
   a plurality of strings of connected photovoltaic panels operable to generate DC current from solar radiation, the plurality of strings connected in parallel to provide power to a solar inverter, each of the plurality of strings having a plurality of first leads of a first polarity and plurality of second leads of a second polarity;
   a first DC bus having a first polarity and a second DC bus having a second polarity, the plurality of first leads connected to the first DC bus and the plurality of second leads connected to the second DC bus;
   a plurality of first fuses, one of the plurality of first fuses connected between each first lead of the plurality of first leads and the first DC bus;
   a first set of bypass lines connected to each of the plurality of first leads and configured to bypass the plurality of first fuses;
   a first sense circuit connected to the first DC bus and the first set of bypass lines, the first sense circuit being activated by (1) receiving, in response to one of the plurality of first fuses being opened by a continuing fault, a current from the first DC bus, and (2) receiving, in response to one of the plurality of first fuses being opened by a temporary fault, a voltage that is a difference between an open circuit voltage of the string of the plurality of strings that experienced the temporary fault and a voltage of the first DC bus;
   a plurality of second fuses, a second fuse of the plurality of second fuses connected between each of the second leads of the plurality of second leads and the second DC bus;

a second set of bypass lines connected to each of the plurality of second leads, the second set of bypass lines configured to bypass the plurality of second fuses; and a second sense circuit connected to the second DC bus and the second set of bypass lines, the second sense circuit being activated by (1) receiving, in response to one of the plurality of second fuses being opened by a continuing fault, a current from the first DC bus, and (2) receiving, in response to one of the plurality of second fuses being opened by a temporary fault, a current from the second DC bus, the first sense circuit having an output through which, when the first sense circuit is activated, provides a signal that indicates the opening of one of the plurality of first fuses, and the second sense circuit having an output through which, when the second sense circuit is activated, provides a signal that indicates the opening of at least one of the plurality of second fuses.

2. The circuit of claim 1, wherein the solar inverter is a single solar inverter that is connected to the first and second DC buses.

3. The circuit of claim 1, wherein the first DC bus has a positive polarity and the second DC bus has a negative polarity.

4. The circuit of claim 1, wherein the first DC bus has a negative polarity and the second DC bus has a positive polarity.

5. The circuit of claim 1, wherein the first sense circuit includes a main circuit optically coupled to a signal generating circuit.

6. The circuit of claim 5, wherein the main circuit is optically coupled to the signal generating circuit by a photocoupler comprising an LED.

7. The circuit of claim 1, wherein the first DC bus is connected to the first sense circuit through a first pair of Zener diodes, each having a breakdown voltage equal to the predetermined voltage; and, wherein the second DC bus is connected to the second sense circuit through a second pair of Zener diodes, each having a breakdown voltage equal to the second predetermined voltage.

8. The circuit of claim 7, wherein the first sense circuit and second sense circuit each include a main circuit optically coupled to a signal generating circuit.

9. The circuit of claim 1, wherein the first DC bus is connected to the first sense circuit through a first pair of Zener diodes, each having a breakdown voltage equal to the predetermined voltage.

10. A photovoltaic power circuit comprising:

a plurality of strings of connected photovoltaic panels operable to generate DC current from solar radiation, the plurality of strings connected in parallel to a solar inverter and having a plurality of first leads of a first polarity and plurality of second leads of a second polarity;

a first DC bus having a first polarity and second DC bus having a second polarity, the plurality of first leads connected to the first DC bus and the plurality of second leads connected to the second DC bus;

a first fuse connected between a first of the plurality of first leads and the first DC bus and a second fuse connected between a second of the plurality of first leads and the first DC bus, wherein there is approximately no potential difference across the first fuse and the second fuse when the first fuse and the second fuse are closed during normal operation of the circuit;

a first sense circuit structured to detect an occurrence of a potential difference across the first fuse or the second fuse exceeding a predetermined voltage, the first sense circuit connected to the first DC bus and receiving current from the first DC bus, the first sense circuit being activated by receipt of a current that in response to the opening of one of the first and second fuses, the first sense circuit having an output signal that, when the first sense circuit is activated by the received current, indicates the opening of one of the first and second fuses;

a third fuse connected between a first of the plurality of second leads and the second DC bus, and a fourth fuse connected between a second of the plurality of second leads and the second DC bus, wherein there is approximately no potential difference across the third fuse and the fourth fuse when the third fuse and the fourth fuse are closed during normal operation of the circuit; and, a second sense circuit structured to detect an occurrence of a potential difference across the third fuse or the fourth fuse exceeding a second predetermined voltage, the second sense circuit connected to the second DC bus, the first of the plurality of second leads and second of the plurality of second leads, the second sense circuit being activated by receipt of a current that corresponds to the opening of one of the third fuse and the fourth fuse and having an output signal that, when generated, indicates the opening of one of the third fuse and the fourth fuse.

11. The circuit of claim 10, wherein the solar inverter is a single solar inverter that is connected to the first and second DC buses.

12. The circuit of claim 10, wherein the first DC bus has a positive polarity and the second DC bus has a negative polarity.

13. The circuit of claim 10, wherein the first DC bus has a negative polarity and the second DC bus has a positive polarity.

14. The circuit of claim 10, wherein the first sense circuit includes a main circuit optically coupled to a signal generating circuit.

15. The circuit of claim 14, wherein the main circuit is optically coupled to the signal generating circuit by a photocoupler comprising an LED.

16. The circuit of claim 10, wherein the first DC bus is connected to the first sense circuit through a first pair of Zener diodes, each having a breakdown voltage equal to the predetermined voltage; and, wherein the second DC bus is connected to the second sense circuit through a second pair of Zener diodes, each having a breakdown voltage equal to the second predetermined voltage.

17. The circuit of claim 16, wherein the first sense circuit and the second sense circuit each include a main circuit optically coupled to a signal generating circuit.

18. The circuit of claim 10, wherein the first DC bus is connected to the first sense circuit through a first pair of Zener diodes, each having a breakdown voltage equal to the predetermined voltage.

* * * * *